United States Patent
Heitzer et al.

(10) Patent No.: US 8,948,973 B2
(45) Date of Patent: Feb. 3, 2015

(54) METHOD OF CONTROLLING A SERVO MOTOR IN AN ELECTRIC VEHICULAR STEERING SYSTEM

(71) Applicant: TRW Automotive GmbH, Alfdorf (DE)

(72) Inventors: Heinz-Dieter Heitzer, Heinsberg (DE); Dirk Zimmermann, Aachen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/788,862

(22) Filed: Mar. 7, 2013

(65) Prior Publication Data
US 2013/0238195 A1 Sep. 12, 2013

(30) Foreign Application Priority Data
Mar. 9, 2012 (DE) .......................... 10 2012 004 915

(51) Int. Cl.
B62D 5/00 (2006.01)
B62D 5/04 (2006.01)
B62D 1/28 (2006.01)

(52) U.S. Cl.
CPC .............. *B62D 5/0463* (2013.01); *B62D 1/286* (2013.01)
USPC ............... 701/42; 701/41; 180/412; 180/413; 180/443; 180/446

(58) Field of Classification Search
CPC ............. B62D 5/0463; B62D 15/0466; B62D 15/025; B62D 6/008; B60T 2201/087
See application file for complete search history.

(56) References Cited

U.S. PATENT DOCUMENTS

| 5,307,892 A | * | 5/1994 | Phillips .......................... 180/422 |
| 5,719,766 A | * | 2/1998 | Bolourchi et al. .............. 701/42 |
| 6,212,453 B1 | * | 4/2001 | Kawagoe et al. ............... 701/41 |
| 8,046,131 B2 | | 10/2011 | Tanaka et al. |

(Continued)

FOREIGN PATENT DOCUMENTS

| DE | 102006051747 A1 | 5/2007 |
| EP | 0640903 A1 | 3/1993 |

(Continued)

OTHER PUBLICATIONS

German Search Report for TRW Automotive GmbH Case No. 10 2012 004 915.3 dated Oct. 18, 2012.

*Primary Examiner* — John R Olszewski
*Assistant Examiner* — Nicholas K Wiltey
(74) *Attorney, Agent, or Firm* — MacMillan, Sobanski & Todd, LLC

(57) ABSTRACT

A method comprising the steps: a manually applied driver steering moment is detected; a requested superposition moment is detected; the driver steering and superposition moments are combined to form an intermediate moment from which an assistance moment is generated by means of a predefined, non-linear amplification function; starting from detected values of the driver steering and superposition moments, a modified superposition moment compensating for friction in the electric steering system at least in part is determined such that the amount of the modified superposition moment is larger than the amount of the superposition moment at least for some pairs of variates comprised of driver steering and superposition moments; the assistance and modified superposition moments are combined to form a motor moment from which a corresponding input signal for a servo motor is established; the servo motor is controlled with the established input signal to provide the motor moment.

10 Claims, 6 Drawing Sheets

(56) References Cited

U.S. PATENT DOCUMENTS

| | | | |
|---|---|---|---|
| 2008/0047775 A1* | 2/2008 | Yamazaki | 180/443 |
| 2008/0189014 A1* | 8/2008 | Tanaka et al. | 701/42 |
| 2008/0255727 A1* | 10/2008 | Lee | 701/41 |
| 2010/0228441 A1* | 9/2010 | Watanabe et al. | 701/41 |
| 2011/0010054 A1* | 1/2011 | Wilson-Jones et al. | 701/42 |
| 2011/0224876 A1* | 9/2011 | Paholics et al. | 701/42 |
| 2012/0265403 A1* | 10/2012 | Svensson et al. | 701/41 |

FOREIGN PATENT DOCUMENTS

| | | |
|---|---|---|
| EP | 0947413 A2 | 10/1999 |
| WO | 2008071926 A1 | 6/2008 |

\* cited by examiner

METHOD OF CONTROLLING A SERVO MOTOR IN AN ELECTRIC VEHICULAR STEERING SYSTEM

CROSS-REFERENCE TO RELATED APPLICATIONS

This application claims priority to German Patent Application No. 10 2012 004 915.3 filed Mar. 9, 2012, the disclosures of which are incorporated herein by reference in entirety.

BACKGROUND OF THE INVENTION

The invention relates to a method of controlling a servo motor in an electric vehicular steering system.

Generally speaking, the steering mechanism of a motor vehicle converts rotary motions of a steering wheel into steering motions of steerable vehicle wheels. To assist the driver in turning the vehicle wheels, an electric motor can be provided to apply a moment which is coupled into the steering mechanism. Usually, a sensor for determining the steering moment applied by the driver is provided in the steering mechanism, the sensor data being used by the steering system to establish an assistance moment to be applied by the motor.

As a rule, the assistance moment is established based on the driver steering moment by a non-linear amplification function, as is described in EP 0 947 413 A2, for example. Incidentally, the assistance moment not only depends on the manually applied driver steering moment in most cases, but also on the vehicle speed, for instance.

An electronic control unit transmits the desired assistance moment into control signals for the electric motor so that the latter generates a corresponding motor moment; as the case may be, a mechanical gear transmission of the steering gearbox and further relevant factors such as the temperature of the power transistors in the electronic control unit may be taken into consideration.

Further, from EP 0 640 903 A1 it is known that the electronic control unit may comprise further control functions requesting additional moments from the electric motor. These control functions are a damping control, an active reset and feedback control or a lane assist system, for instance, and usually result in a so-called superposition of moments, i.e. an additional moment which is added to the assistance moment or subtracted from it.

WO 2008/071926 A1 points out the disadvantages and problems of conventional concepts for the superposition of moments and suggests a concept to overcome them, in which a requested superposition moment is considered twice during the determination of a motor moment. On the one hand, the manually applied driver steering moment is combined with the requested superposition moment to determine the input value for the non-linear amplification function and, on the other hand, the obtained assistance moment is again combined with the requested superposition moment in order to determine the motor moment.

As already mentioned in WO 2008/071926 A1, an amount of the requested superposition moment is often limited to a predeterminable maximum value for reasons of safety, allowing the driver to override this superposition moment without difficulty by a manually applied driver steering moment. Thus, the driver always keeps control of the electric steering system.

However, it has been found that the maximum values of the superposition moment usually are in a magnitude with which an effective steering motion of the vehicle wheels hardly occurs due to the friction in the vehicular steering system. This is particularly unsatisfactory in case an automatic lane assist system is used.

BRIEF SUMMARY OF THE INVENTION

Starting from the method of controlling an electric motor described in WO 2008/071926 A1, it is a feature of the present invention to provide a method of controlling a servo motor in an electric vehicular steering system in which not only superposition moments are taken into consideration but influences of the system-inherent friction are compensated for as well.

According to the invention, this feature is met by a method of controlling a servo motor in an electric vehicular steering system in consideration of superposition moments and by compensating for influences of the system-inherent friction, characterized by the following steps:

a manually applied driver steering moment is detected;

a requested superposition moment is detected;

the driver steering moment and the superposition moment are combined to form an intermediate moment from which an assistance moment is generated by means of a predefined, non-linear amplification function;

starting from the detected values of the driver steering moment and of the superposition moment, a modified superposition moment compensating for the friction in the electric vehicular steering system at least in part is determined such that the amount of the modified superposition moment is larger than the amount of the superposition moment at least for some pairs of variates comprised of driver steering moment and superposition moment;

the assistance moment and the modified superposition moment are combined to form a motor moment from which a corresponding input signal for the servo motor is established;

the servo motor is controlled with the established input signal in order to provide the motor moment.

With this method, requested superposition moments are enhanced depending on a manually applied driver steering moment in such a manner that a satisfactory actuation of the electric vehicular steering system by driver assistance systems is ensured even in case of small absolute values of the superposition moments.

In a variant of the method, the driver steering moment and the superposition moment are added in order to obtain the intermediate moment.

Further, the assistance moment and the superposition moment can be added in order to obtain the motor moment. The simple addition of driver steering moment and superposition moment or of assistance moment and superposition moment is the simplest form of combining two moments and has provided satisfactory results in the present method.

In a further variant of the method, the modified superposition moment is determined such that the amount of the modified superposition moment is always larger than or equal to the amount of the superposition moment. This ensures that the method according to the invention achieves in any case at least the motor moment and hence the steering motions according to the method known from WO 2008/071926 A1.

Preferably, the predefined, non-linear amplification function generates an assistance moment of at most 20% of the respective intermediate moment for intermediate moments up to an amount of 0.5 Nm.

It is particularly preferred that the predefined, non-linear amplification function generates an assistance moment of at most 33% of the respective intermediate moment for intermediate moments up to an amount of 1.0 Nm. These small assistance moments in the range of intermediate moments with small absolute values are also referred to as the "deadband" of the amplification function. For small steering angles, i.e. in particular when driving straight ahead, said "deadband" ensures a tight and safe steering feeling for the driver.

In a further variant of the method, the requested superposition moment is limited to a predefined maximum value. Such a limitation of the superposition moment is a safety requirement in many cases, which is to ensure that the driver is always able to override the requested superposition moment by a manually applied driver steering moment. To give an example, the maximum value for amount of the requested superposition moment may be in the range of 2.5 Nm.

In a variant of the method, the modified superposition moment is established from a predefined three-dimensional characteristic diagram in which the modified superposition moment is plotted versus the driver steering moment and the superposition moment. A characteristic diagram of this type allows the establishment of the modified superposition moment in a very short time and with small computing effort. Nevertheless, the provision of a suitable characteristic diagram involves some empiric effort and/or effort in terms of simulation technology.

In an alternative variant of the method, the modified superposition moment is established by a predefined algorithm in which the superposition moment is first multiplied by a first factor taking into account the amount of the superposition moment and a second factor taking into account the amount of the driver steering moment, and is then added to the superposition moment. Compared to the provision of a suitable characteristic diagram, the determination of suitable parameters for the algorithm involves a significantly smaller effort. Using the algorithm in the procedure of the method, however, results in a somewhat increased computational effort.

In the method variant with the predefined algorithm, the first factor is preferably constrained to $0 \leq F_1 \leq 10$, particularly preferred to $0 \leq F_1 \leq 5$, and the second factor is preferably constrained to $0 \leq F_2 \leq 1$. Such a parameterization of the algorithm has resulted in practice in a particularly advantageous servo motor control scheme.

The three-dimensional characteristic diagram or the algorithm for the determination of the modified superposition moment can first be empirically established for a specific series of electric vehicular steering systems and then be provided for further vehicular steering systems of identical construction.

Other advantages of this invention will become apparent to those skilled in the art from the following detailed description of the preferred embodiments, when read in light of the accompanying drawings.

DETAILED DESCRIPTION OF THE INVENTION

Figure 1:
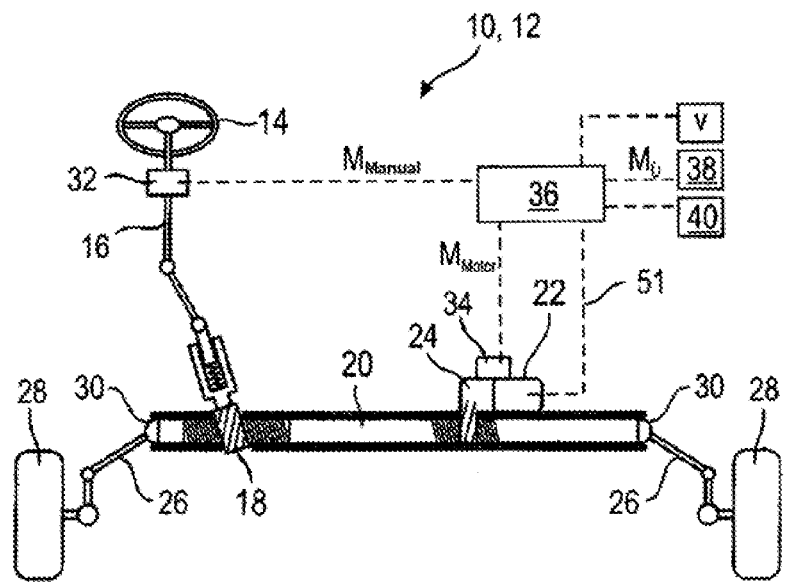
FIG. 1 is a schematic drawing of an electric vehicular steering system.
Figure 2:
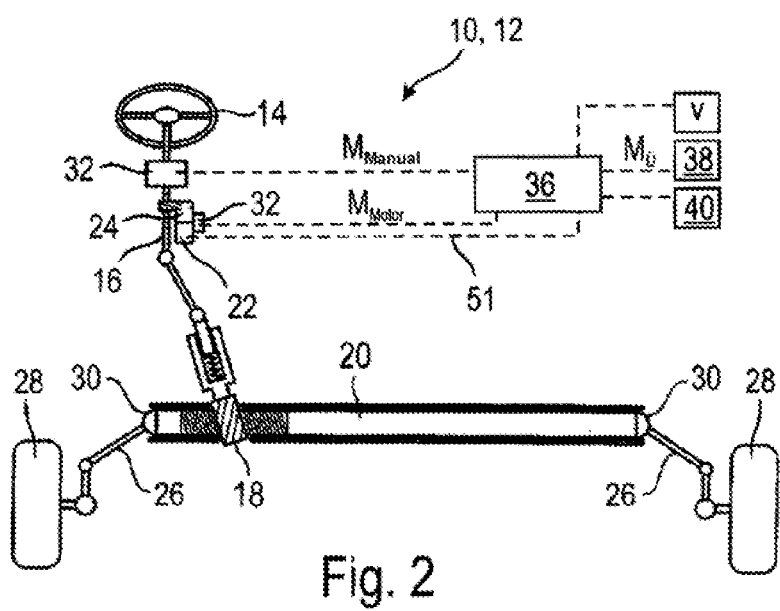
FIG. 2 is a schematic drawing of an alternative electric vehicular steering system.

FIGS. 1 and 2 schematically illustrate embodiments of a rack-and-pinion steering 10 for motor vehicles. Here, the rack-and-pinion steering 10 is part of an electric vehicular steering system 12 in which a steering wheel 14 is connected to a pinion 18 through a steering column 16 in each case. The pinion 18 meshes with a rack 20 so that the latter is acted upon by a driver steering moment $M_{Manual}$ manually applied to the steering wheel 14. In addition, an electric servo motor 22 is provided which is capable of exerting a motor moment $M_{motor}$ on the rack 20 via a gearbox 24 in a known manner.

The method, described below, of controlling the servo motor 22 in electric vehicular steering systems 12 in consideration of superposition moments $M_{Ü}$ and by compensating for influences of the system-inherent friction is particularly suited to electro-mechanic vehicular steering systems 12, in fact both in the variant in the form of a rack drive exemplarily illustrated in FIG. 1 where the servo motor 22 engages the rack 20, and in the alternative variant in the form of a steering column drive according to FIG. 2, where the servo motor 22 engages the steering column 16.

According to FIGS. 1 and 2, the rack 20 has its axial ends coupled to steerable wheels 28 of a vehicle via tie rods 26, the rack 20 being connected to the tie rods 26 by one ball joint 30 each.

The electric vehicular steering system 12 may also comprise various sensors 32, 34; FIGS. 1 and 2 exemplarily illustrate a steering moment sensor 32 as well as a sensor 34 for detecting the motor moment $M_{Motor}$ and/or a rotation angle of the motor. These sensors 32, 34 pass their detected sensor data to an electronic control unit 36.

In addition, external driver assistance systems 38, 40 such as a lane assist system 38 and/or a park assist system 40 may be provided, which are connected to the electronic control unit 36 to request a superposition moment $M_{Ü}$.

Figure 3:
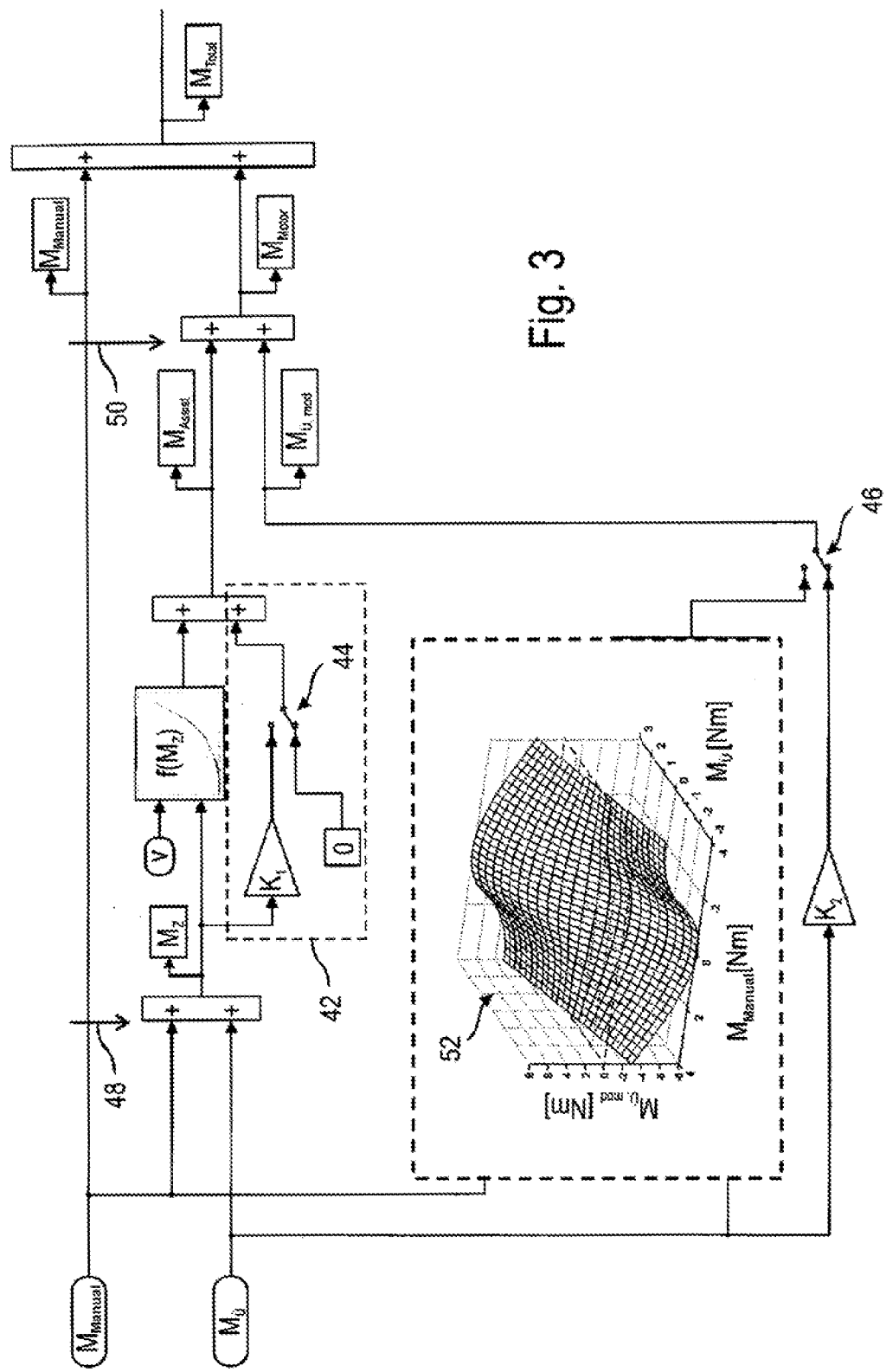
FIG. 3 shows a schematic flow of the method according to the invention for controlling a servo motor in an electric vehicular steering system according to a first method variant.

FIG. 3 shows the schematic flow of a method of controlling the servo motor 22 in the electric vehicular steering system 12 in consideration of superposition moments $M_{Ü}$ and by compensating for influences of the system-inherent friction. Here, the method is essentially carried out by the electronic control unit 36 and is continuously repeated in short time intervals, e.g. in fractions of a second, to provide a continual servo assistance by the electric servo motor 22.

First, the manually applied driver steering moment $M_{Manual}$ is detected. To this end, for instance, the steering moment sensor 32 (cf. FIGS. 1 and 2) is provided, continuously passing its sensor data to the electronic control unit 36.

Apart from the manually applied driver steering moment $M_{Manual}$, the requested superposition moment $M_{Ü}$ is also detected. This superposition moment $M_{Ü}$ is requested e.g. by the lane assist system 38 and/or the park assist system 40. In this process, the requested superposition moments $M_{Ü}$ are continuously adapted by the respective driver assistance system 38, 40 and passed to the electronic control unit 36.

In a following processing step, the driver steering moment $M_{Manual}$ and the superposition moment $M_{Ü}$ are combined to form an intermediate $M_Z$ from which an assistance moment $M_{Assist}$ is generated by means of a predefined, non-linear amplification function $f(M_Z)$. The combination of the driver steering moment $M_{Manual}$ and the superposition moment $M_{Ü}$ to the intermediate moment $M_Z$ is effected in the present case by a simple addition.

The non-linear amplification function $f(M_Z)$ is already basically known from prior art so that a particularly advantageous function profile shall be explained in brief only.

Generally, the non-linear amplification function $f(M_Z)$ indicates the relation between the intermediate moment $M_Z$ and the assistance moment $M_{Assist}$, with the amplification function $f(M_Z)$ being formed so as to be point-symmetric and further monotonically or even strictly monotonically increasing. Here, the assistance moment $M_{Assist}$ has an assisting effect on the manually applied driver steering moment $M_{Manual}$ as well as an amplifying effect on the requested superposition moment $M_{Ü}$.

Figure 10:
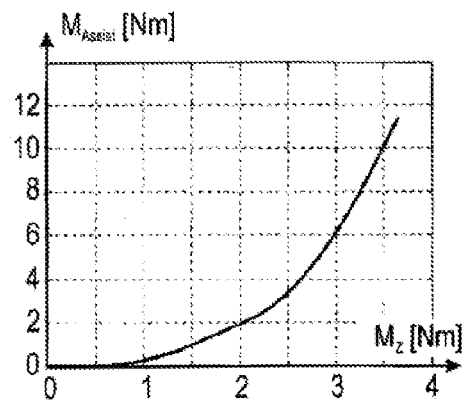
FIG. 10 shows a non-linear amplification function for the method according to the invention of controlling a servo motor.

With a particularly preferred amplification function $f(M_Z)$ according to FIG. 10, an assistance moment $M_{Assist}$ of at most 20% of the respective intermediate moment $M_Z$ is generated for intermediate moments $M_Z$ up to an amount of 0.5 Nm, i.e. assistance moments $M_{Assist}$ of at most 0.1 Nm.

For intermediate moments $M_Z$ up to an amount of 1.0 Nm, the non-linear amplification function $f(M_Z)$ preferably generates an assistance moment $M_{Assist}$ of at most 33% of the respective intermediate moment $M_Z$, i.e. assistance moments $M_{Assist}$ of at most 0.33 Nm (cf. FIG. 10, too).

The small amplification in the range of the so-called "deadband", i.e. in the range of intermediate moments $M_Z$ with small absolute values, provides for a desired "direct" steering behavior of the electric vehicular steering system 12, experienced by the driver as pleasant. In order to illustrate this, FIG. 11 depicts a characteristic steering curve 41 in which the intermediate moment $M_Z$ is plotted versus a steering angle $\alpha$.

In accordance with FIGS. 3 and 6, FIGS. 10 and 11 each plot the intermediate moment $M_Z$. Nevertheless, the illustrated curves allow to draw conclusions as to the steering feeling for the driver in the "normal" driving operation, since in that case a superposition moment $M_{Ü}$ is generally not requested and the intermediate moment $M_Z$ will then correspond to the manually applied driver steering moment $M_{Manual}$.

Figure 11:
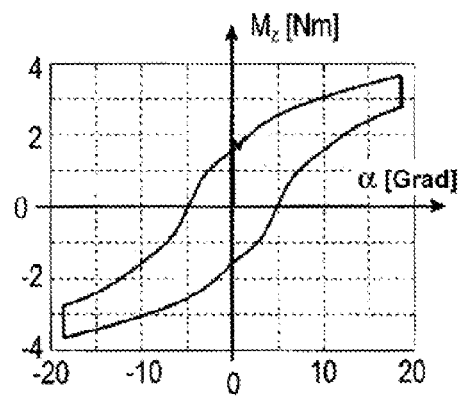
FIG. 11 shows a characteristic steering curve of an electric vehicular steering system with an amplification function according to FIG. 10.

According to FIG. 11, the small amplification in the range of intermediate moments $M_Z$ with small absolute values generates a comparably steep gradient for small steering angles $\alpha$, said gradient resulting in a quite pronounced S-shape of the characteristic steering curve 41. In this way, a very direct steering feeling is produced in the range of small steering angles $\alpha$, the driver perceiving said feeling as pleasant and safe.

In case that the non-linear amplification function $f(M_Z)$ already provides a higher assistance for intermediate moments $M_Z$ with small absolute values, in other words, provides for a larger assistance moment $M_{Assist}$, i.e. has no "deadband", the S-shape of the characteristic steering curve 41 in FIG. 11 would be more and more linearized with a concomitant reduction of the gradient in the range of small steering angles $\alpha$, generating an undesired, less direct steering feeling which is perceived by the driver as "spongy" and unsafe.

According to FIG. 3, an optional supplementary amplification scheme 42 (framed in broken lines) is provided which additionally adds the intermediate moment $M_Z$ multiplied by a constant $K_1$ to the result of the non-linear amplification function $f(M_Z)$ to obtain the assistance moment $M_{Assist}$. The value for the constant K can be selected here as desired and is in the order of 3.5, for example. In the present case, the supplementary amplification scheme 42 can be selectively activated and deactivated via a switch 44.

Parallel to the generation of the assistance moment $M_{Assist}$, a modified superposition moment $M_{Ü,mod}$ which compensates for the friction in the electric vehicular steering system 12 at least in part is established starting from the detected values of the driver steering moment $M_{Manual}$ and of the superposition moment $M_{Ü}$ in such a manner that the amount of the modified superposition moment $M_{Ü,mod}$ is larger than the amount of the superposition moment $M_{Ü}$ at least for some pairs of variates of driver steering moment $M_{Manual}$ and superposition moment $M_{Ü}$. The effect resulting therefrom as well as the precise determination of the modified superposition moment $M_{Ü,mod}$ will be explained in more detail below.

In the method variant described in FIG. 3, the motor moment $M_{Motor}$ can be established via a switch 46 optionally with or without modification of the superposition moment $M_{Ü}$.

Without consideration of the modified superposition moment $M_{Ü,mod}$, the assistance moment $M_{Assist}$ is immediately combined with the requested superposition moment $M_{Ü}$ to result in the motor moment $M_{Motor}$ from which a corresponding input signal for the servo motor 22 is established. In this process, the requested superposition moment $M_{Ü}$ may be multiplied by a factor $K_2$. If the factor $K_2=1$ is selected, this would correspond to the known control scheme of the servo motor 22 according to WO 2008/071926 A1 in which the requested superposition moment $M_{Ü}$ is taken into consideration twice, namely during the determination of the input value for the non-linear amplification function $f(M_Z)$ (cf. arrow 48) and further once again in establishing the motor moment $M_{Motor}$ from the assistance moment $M_{Assist}$, i.e. from the output value of the non-linear amplification function $f(M_Z)$ (cf. arrow 50). However, a compensation for influences of the system-inherent friction does not occur in the context above.

In order to compensate for the system-inherent friction of the electric vehicular steering system 12 at least in part, the assistance moment $M_{Assist}$ and the modified superposition moment $M_{Ü,mod}$ are combined to form the motor moment $M_{Motor}$ from which a corresponding input signal 51 for the servo motor 22 is established.

In the method variant according to FIG. 3, the assistance moment $M_{Assist}$, on the one hand, and the requested superposition moment $M_Ü$ or the modified superposition moment $M_{Ü,mod}$, on the other hand, are simply added to obtain the motor moment $M_{Motor}$.

By analogy to conventional methods of controlling a servo motor in electric vehicular steering system, it is readily possible—during establishment of the motor moment $M_{Motor}$ or the input signal 51—to take into consideration a mechanic transmission of the steering gearbox and further relevant factors such as the temperature of the power transistors provided in the electronic control unit 36, where applicable.

Ultimately, the servo motor 22 is controlled with the established input signal 51 in order to provide the desired motor moment $M_{Motor}$.

Thus, the rack 20 of the electric vehicular steering system 12 is acted upon by a total moment $M_{Total}$ which corresponds to a sum of the manually applied driver steering moment $M_{Manual}$ and the motor moment $M_{Motor}$.

FIG. 3 shows a first variant of the method of controlling the servo motor 22 in the electric vehicular steering system 12 in consideration of superposition moments $M_Ü$ and by compensating for influences of the system-inherent friction.

In this variant of the method, the modified superposition moment $M_{Ü,mod}$ is established from a predefined three-dimensional characteristic diagram 52 in which the modified superposition moment $M_{Ü,mod}$ is plotted versus the driver steering moment $M_{Manual}$ and the requested superposition moment $M_Ü$.

Figure 4:
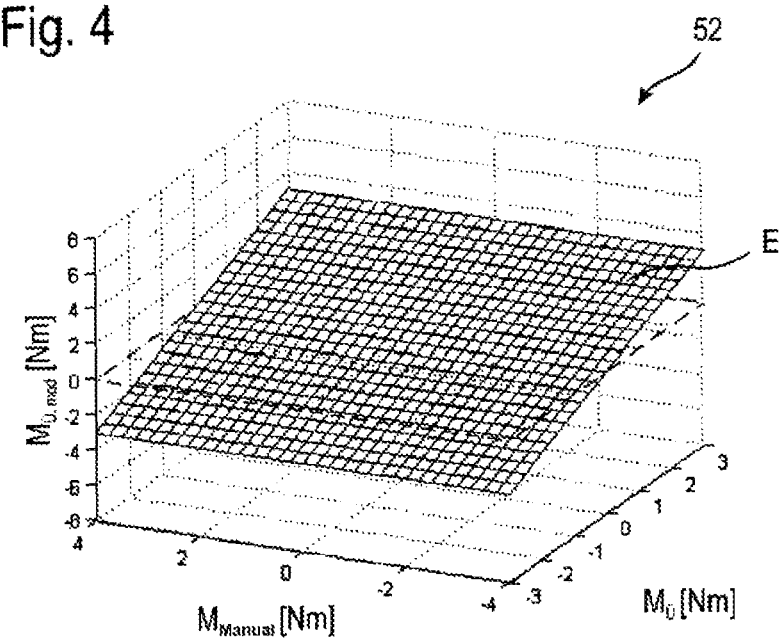
FIG. 4 is a three-dimensional characteristic diagram usable for the first method variant according to FIG. 3 without any compensation of influences of the system-inherent friction.
Figure 5:
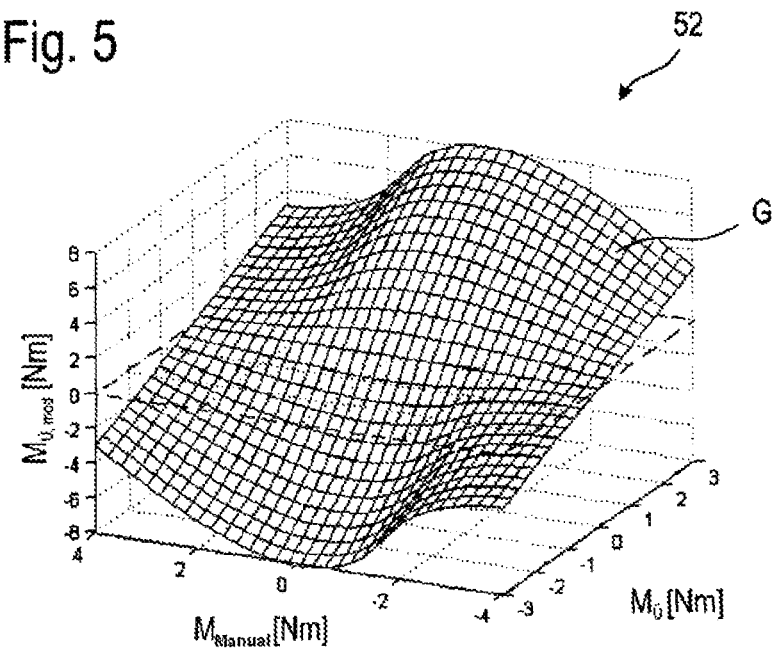
FIG. 5 is a three-dimensional characteristic diagram usable for the first method variant according to FIG. 3 with compensation for the influences of the system-inherent friction.

FIGS. 4 and 5 indicate a possible procedure as to how such a three-dimensional characteristic diagram 52 can be predefined.

As a starting point for the three-dimensional characteristic diagram 52, a planar area E is selected according to FIG. 4, assigning a modified superposition moment $M_{Ü,mod}$ to each superposition moment $M_Ü$ independently of the driver steering moment $M_{Manual}$, with the amount of the modified superposition moment $M_{Ü,mod}$ corresponding to the amount of the superposition moment $M_Ü$ in each case. In other words, a modification of the requested superposition moment $M_Ü$ does not occur.

If the planar area E is selected as the three-dimensional characteristic diagram 52, controlling the servo motor 22 is effected in the end without any compensation for influences of the system-inherent friction, analogous to WO 2008/071926 A1 in prior art. For $K_2=1$, the position of the switch 46 is of no importance in that case.

Based on FIG. 4, the three-dimensional characteristic diagram 52 is changed now such that the amount of the modified superposition moment $M_{Ü,mod}$ is always larger than or equal to the amount of the requested superposition moment $M_Ü$, and the requested superposition moments $M_Ü$ are significantly increased in particular for driver steering moments $M_{Manual}$ with small absolute values. As per illustration, the three-dimensional characteristic diagram 52 is deformed from the planar area E according to FIG. 4 to a curved area G according to FIG. 5.

FIG. 5 exemplarily shows a three-dimensional characteristic diagram 52 in which the requested superposition moment $M_Ü$ undergoes a maximum amplification with a driver steering moment $M_{Manual}=0$ (factor approximately 2.7). This amplification is (non-linearly) reduced with increasing absolute values of the driver steering moment $M_{Manual}$ until there is no amplification at all (factor 1) with driver steering moments $|M_{Manual}|\geq 4$ Nm and the modified superposition moment $M_{Ü,mod}$ is equal to the requested superposition moment $M_Ü$.

As the modified superposition moment $M_{Ü,mod}$, instead of the requested superposition moment $M_Ü$, is included in the further calculation of the motor moment $M_{Motor}$, the amount of the motor moment $M_{Motor}$ also increases for low driver steering moments $M_{Manual}$, whereby influences of the system-inherent friction are compensated for so that the reaction of the electric vehicular steering system 12 to requested superposition moments $M_Ü$ is considerably improved.

For illustrating this, FIGS. 12 to 15 show steering reactions of an electric vehicular steering system 12 based on diagrams of superposition moment vs. steering angle.

Figure 12:
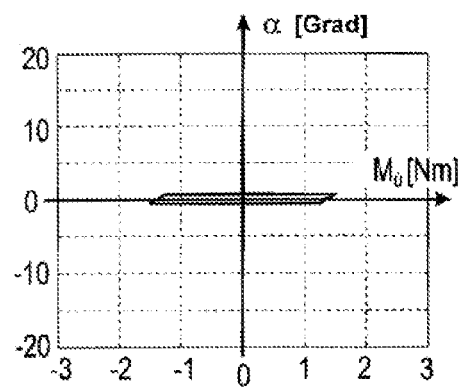
FIG. 12 shows a diagram of superposition moment vs. steering angle in controlling the servo motor according to prior art.
Figure 14:
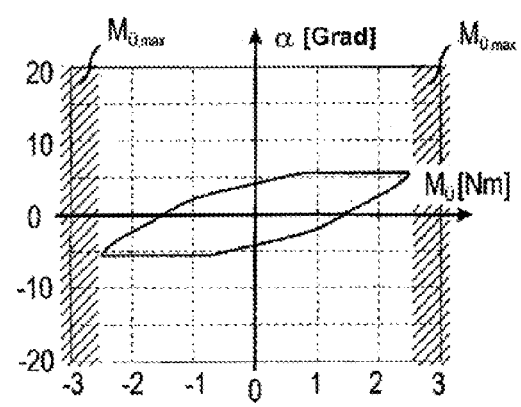
FIG. 14 shows a further diagram of superposition moment vs. steering angle in controlling the servo motor according to prior art.

FIGS. 12 and 14 show the reaction of a vehicular steering system 12 for a conventionally controlled servo motor 22 for requested superposition moments $M_Ü$ of 1.5 Nm and 2.5 Nm, respectively. The resultant steering angles α with α≈1 and α≈6 are very small and are insufficient for driver assistance systems such as lane assist systems 38 or park assist systems 40.

Figure 13:
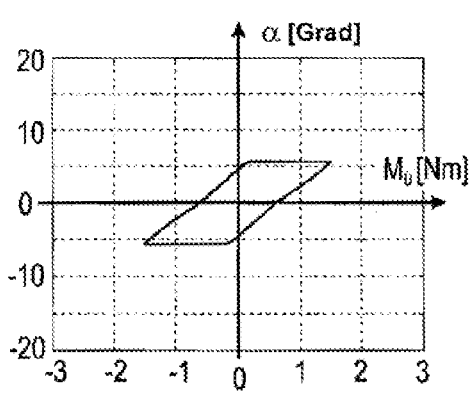
FIG. 13 shows the diagram of superposition moment vs. steering angle as in FIG. 12 in controlling the servo motor according to the invention.
Figure 15:
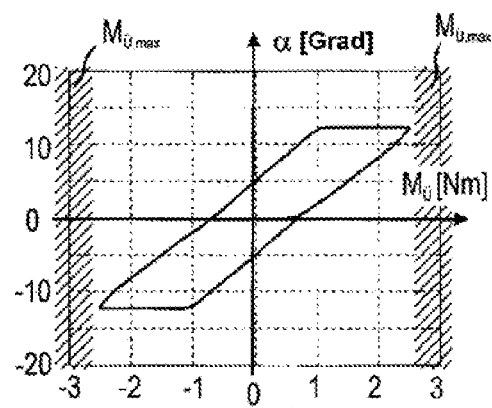
FIG. 15 shows the diagram of superposition moment vs. steering angle as in FIG. 14 in controlling the servo motor according to the invention.

FIGS. 13 and 15 likewise show the reaction of the electric vehicular steering system 12 to the requested superposition moments $M_Ü$ of 1.5 Nm and 2.5 Nm, respectively, but with the servo motor 22 having been controlled according to the method of the invention described above. The resultant steering angles α with α≈6 and α≈13 assume acceptable values now.

The described method is of special interest because the amount of the requested superposition moment $M_Ü$ is often limited to a predefined maximum value $Mt_{Ü,max}$ due to safety reasons. This is to ensure that the driver keeps control of the vehicle at all times and can override a requested superposition moment $M_Ü$ without any difficulty. Here, the predefined maximum value $M_{Ü,max}$ is usually in the order of approximately 3.0 Nm, as indicated in FIGS. 14 and 15.

With particular consideration of this safety requirement, it will be understood that the method according to prior art can not provide a satisfying steering reaction for the application of driver assistance systems (cf. FIGS. 12 and 14).

Figure 6:
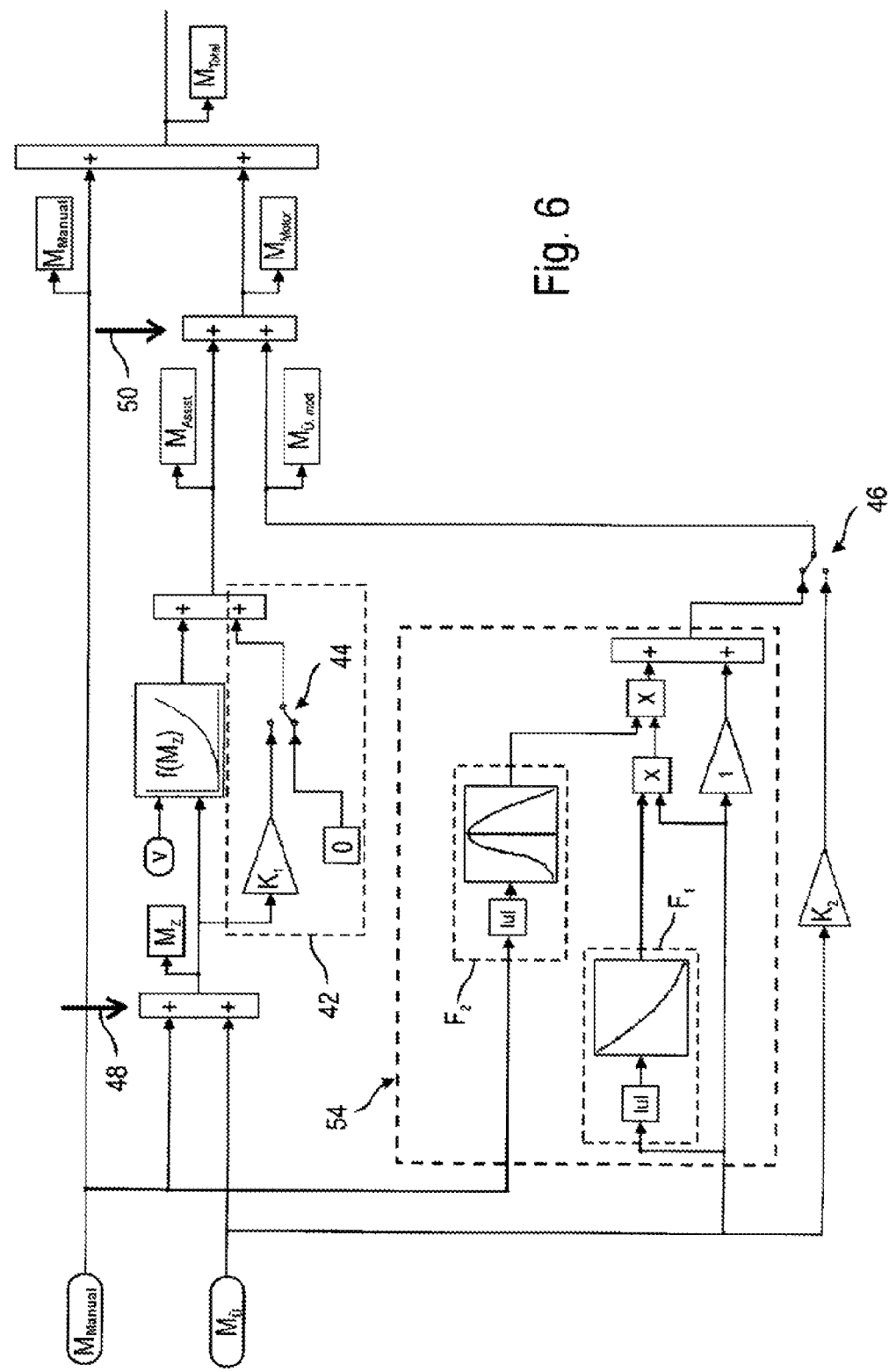
FIG. 6 shows a schematic flow of the method according to the invention for controlling a servo motor in an electric vehicular steering system according to a second variant of the method.

FIG. 6 shows a second variant of the method of controlling the servo motor 22 in the electric vehicular steering system 12 in consideration of superposition moments $M_Ü$ and by compensating for influences of the system-inherent friction.

The second method variant according to FIG. 6 essentially differs from the first method variant according to FIG. 3 in that the modified superposition moment $M_{Ü,mod}$ is not established by means of a predefined three-dimensional characteristic diagram 52, but with a predefined algorithm 54 in which the superposition moment $M_Ü$ first is multiplied by a first factor $F_1$ taking into account the amount of the superposition moment $M_Ü$ and then by a second factor $F_2$ taking into account the amount of the driver steering moment $M_{Manual}$, and is then added to the superposition moment $M_Ü$.

Figure 7:
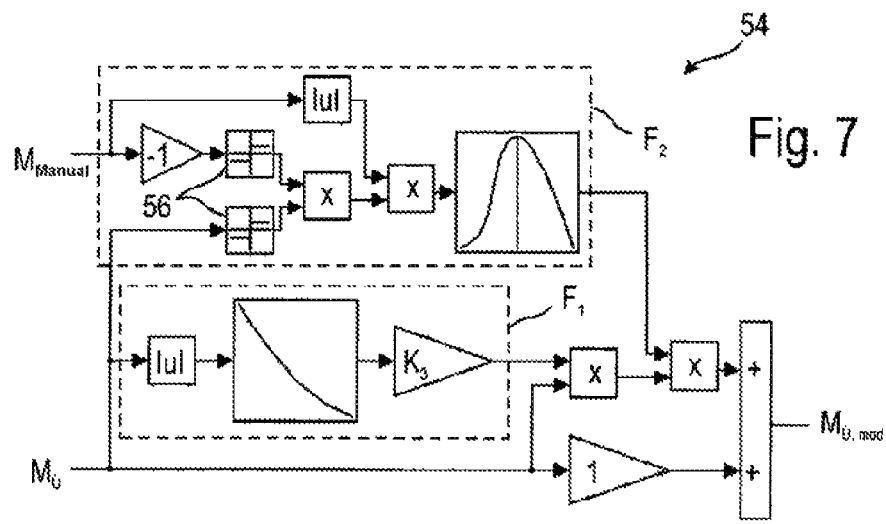
FIG. 7 shows an algorithm usable for the second variant of the method according to FIG. 6 for compensating for influences of the system-inherent friction.
Figure 9:
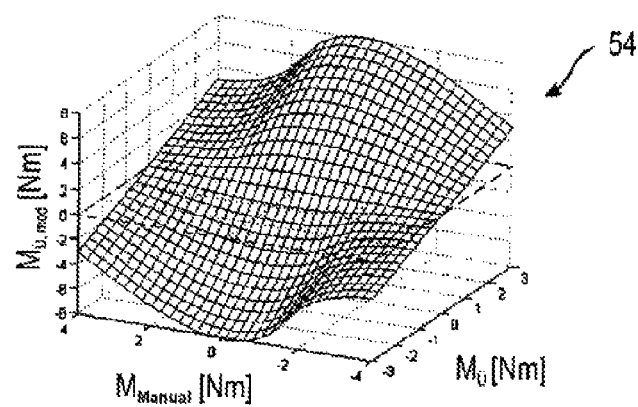
FIG. 9 is a three-dimensional characteristic diagram illustrating the entire algorithm according to FIG. 7.

This algorithm 54 is shown in FIG. 7 in greater detail and is graphically illustrated in FIG. 9.

Depending on the specific marginal conditions of the respective vehicular steering system 12 as well as on the required amount of the superposition moment $M_Ü$, it is preferred that the first factor $F_1$ is constrained to $0 \leq F_1 \leq 10$, in particular $0 \leq F_1 \leq 5$. In the present case, the marginal conditions have an influence on the course of a monotonically decreasing function $f_{Alg}(M_Ü)$ as well as on the value of an optional multiplier $K_3$. Starting from the amount of the requested superposition moment $M_Ü$, the function $f_{Alg}(M_Ü)$ generates a value which (in consideration of the optional multiplier $K_3$, if applicable) corresponds to the first factor $F_1$.

Depending on the specific marginal conditions of the respective vehicular steering systems 12 and on the amount of the driver steering moment $M_{Manual}$, it is preferred that $F_2$ is constrained to $0 \leq F_2 \leq 1$. In the present case, the marginal conditions have an influence on the course of a function $f_{Alg}$ ($M_{Manual}$) which has an absolute maximum at $M_{Manual}=0$. Based on the signs of the requested superposition moment $M_{Ü}$ and of the driver steering moment $M_{Manual}$ (cf. indicated sign functions 56 in FIG. 7) and starting from the amount of the driver steering moment $M_{Manual}$, the function $f_{Alg}(M_{Manual})$ generates the second factor $F_2$.

The factors $F_1$, $F_2$ are multiplied with each other and by the requested superposition moment $M_{Ü}$ and are added to the requested superposition moment $M_{Ü}$ in the next step to obtain the modified superposition moment $M_{Ü,mod}$.

Figure 8:
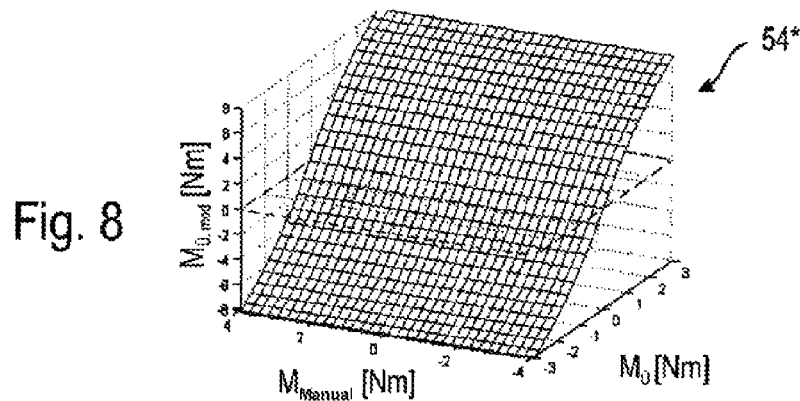
FIG. 8 is a three-dimensional characteristic diagram illustrating a part of the algorithm according to FIG. 7.

If the second factor $F_2$ is not taken into consideration, a partial algorithm 54\* will appear first which brings about a considerable, in particular non-linear amplification of the requested superposition moment $M_{Ü}$ and is illustrated in FIG. 8.

The second factor $F_2$ diminishes said amplification by the partial algorithm 54\* again for driver steering moments $M_{Manual}$ with increasing absolute values, finally resulting in a modified superposition moment $M_{Ü,mod}$ which in the present case corresponds to the modified superposition moment $M_{Ü,mod}$ according to the first variant of the method (cf. FIGS. 5 and 9).

It is preferred that the three-dimensional characteristic diagram 52 or the algorithm 54 for the determination of the modified superposition moment $M_{Ü,mod}$ is first established in empiric fashion or by simulation for an electric vehicular steering system 12 of a specific series and then adopted as a provision for vehicular steering systems 12 of identical construction.

The described method of controlling the servo motor 22 offers the advantage that a predefined superposition moment $M_{Ü}$ is amplified for low driver steering moments $M_{Manual}$ to such an extent that the vehicular steering system 12 provides a system reaction which is sufficient for driver assistance systems. At the same time, the amplification is reduced for driver steering moments $M_{Manual}$ with increasing absolute values to such an extent that the driver is able to readily override the requested superposition moment $M_{Ü}$ and the (in this field frequently identical) modified superposition moment $M_{Ü,mod}$ when a driver steering moment $M_{Manual}$ is reached which is in the order of a predefined, maximum superposition moment $M_{Ü,max}$.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

What is claimed is:

1. A method of controlling a servo motor in an electric vehicular steering system in consideration of superposition moments and by compensating for influences of the system-inherent friction, the method comprising the following steps:
   a manually applied driver steering moment is detected;
   a requested superposition moment requested by an external driver assistance system is detected;
   the driver steering moment and the requested superposition moment are added to form an intermediate moment from which an assistance moment is generated by means of a predefined, non-linear amplification function;
   starting from the detected values of the driver steering moment and of the requested superposition moment, a modified superposition moment compensating for the friction in the electric vehicular steering system is determined such that the amount of the modified superposition moment is larger, by a factor greater than one, than the amount of the requested superposition moment at least for some pairs of variates comprised of driver steering moment and requested superposition moment;
   the assistance moment and the modified superposition moment are added to form a motor moment from which a corresponding input signal for the servo motor is established; and
   the servo motor is controlled with the established input signal in order to provide the motor moment.

2. The method according to claim 1, wherein the modified superposition moment is determined such that the amount of the modified superposition moment is always larger than or equal to the amount of the requested superposition moment.

3. The method according to claim 1, wherein the predefined, non-linear amplification function generates an assistance moment of at most 20% of the respective intermediate moment for intermediate moments up to an amount of 0.5 Nm.

4. The method according to claim 1, wherein the predefined, non-linear amplification function generates an assistance moment of at most 33% of the respective intermediate moment for intermediate moments up to an amount of 1.0 Nm.

5. The method according to claim 1, wherein the amount of the requested superposition moment is limited to a predefined maximum value.

6. The method according to claim 1, wherein the modified superposition moment is established from a predefined three-dimensional characteristic diagram based upon the driver steering moment and the requested superposition moment.

7. The method according to claim 1, wherein the modified superposition moment is established by a predefined algorithm in which the requested superposition moment is first multiplied by a first factor taking into account the amount of the requested superposition moment and a second factor taking into account the amount of the driver steering moment, and is then added to the requested superposition moment.

8. The method according to claim 7, wherein the first factor is constrained to $0 \leq F_1 \leq 10$ and the second factor is constrained to $0 \leq F_2 \leq 1$.

9. The method according to claim 7, wherein the first factor is constrained to $0 \leq F_1 \leq 5$ and the second factor is constrained to $0 \leq F_2 \leq 1$.

10. The method according to claim 6, wherein the three-dimensional characteristic diagram or the algorithm for the determination of the modified superposition moment is first empirically established for a specific series of electric vehicular steering systems and then is provided for further vehicular steering systems of identical construction.

\* \* \* \* \*